The specification in this patent is not in print.
9629X
PATENTED APR. 28, 1836.
A. MAN.
COTTON CONDENSING GUIDE.
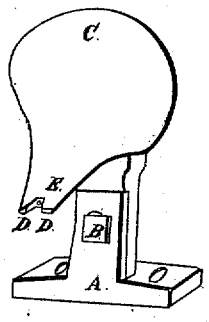
THE NORRIS PETERS CO., PHOTO-LITHO., WASHINGTON, D. C.

Arlon Man, of Smithfield. R. Island.
Letters Patent.

The schedule referred to in these Letters Patent and making part of the same, containing a description in the words of the said Arlon Man himself of his improvement in the cotton condensing guide, for preparing cotton for yarns —

To all to whom these presents shall come: Be it known that I Arlon Man, of Smithfield in the State of Rhode Island, have invented a new and useful improvement in preparing cotton for yarns — called the cotton condensing guide, and that the following is a true and exact description of the same, viz, a guide for conducting a sliver of cotton from a carding drawing or other machine through a pair of rollers, is made with the stand and trumpet in detached in detached parts, connected together by a bolt and nut. The internal structure and broad end of the trumpet do not vary from the usual form; the small end is made externally like a thin wedge which (when the guide is standing in its place) is entered between the rollers to the point where the two surfaces of the rollers are in contact. a slit is made in the sharp end of the wedge in the direction of the aperture of the trumpet. This modification presents the wedge in a forked shape with a perforation at the base of the prongs expanding internally until it forms the diameter of the broad end of the trumpet. The circumferences of the rollers being in contact with the inclined sides of the wedge prevent the sliver from expanding vertically; while the prongs by entering to the point where the rollers are in contact with each other, ensures the sliver against any lateral expansion. The rollers are made to exert a heavy pressure on the sliver thereby drawing it through the guide, & condensing it by the aid of the guide into a smaller compass than has been accomplished by any plan heretofore known — I claim as my invention the forked wedge at the small end of the trumpet, with the aperture at the base of the prongs.

Smithfield R. I. March 11. 1836 —

Arlon Man

Witnesses
Chas Jackson
Samuel F. Man

Drawing Certified [illegible]

5078.27

[illegible]